(12) United States Patent
Svobodnik

(10) Patent No.: US 7,141,944 B2
(45) Date of Patent: Nov. 28, 2006

(54) DEVICE AND METHOD FOR CONTROLLING AN ELECTRICAL MOTOR MOUNTED ON THE CROSSARM OF A BRIDGE CIRCUIT

(75) Inventor: Gregor Svobodnik, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/058,151

(22) Filed: Feb. 15, 2005

(65) Prior Publication Data

US 2005/0200323 A1 Sep. 15, 2005

(30) Foreign Application Priority Data

Feb. 20, 2004 (DE) .................. 10 2004 008 394

(51) Int. Cl.
*H02P 1/00* (2006.01)

(52) U.S. Cl. .................. 318/254; 318/245; 318/439; 318/280

(58) Field of Classification Search ........ 318/280–286, 318/290–294, 434
See application file for complete search history.

(56) References Cited

U.S. PATENT DOCUMENTS

| 4,134,051 A * | 1/1979 | Pelchat et al. ........... 318/282 |
| 4,841,205 A * | 6/1989 | Bekkema ................. 318/282 |
| 6,094,025 A * | 7/2000 | Rosa ...................... 318/381 |
| 6,377,015 B1 * | 4/2002 | Nakabayashi et al. ...... 318/650 |
| 6,487,062 B1 * | 11/2002 | Kristiansen ................ 361/189 |
| 6,509,705 B1 * | 1/2003 | Bastholm et al. .......... 318/434 |
| 6,856,112 B1 * | 2/2005 | Ohshima .................. 318/286 |
| 6,867,563 B1 * | 3/2005 | Ohshima .................. 318/434 |
| 6,879,121 B1 * | 4/2005 | Haussecker et al. ....... 318/280 |
| 6,954,043 B1 * | 10/2005 | Ohshima .................. 318/265 |
| 7,002,309 B1 * | 2/2006 | Ohshima .................. 318/286 |
| 7,015,665 B1 * | 3/2006 | Ohshima .................. 318/280 |
| 2002/0117982 A1 * | 8/2002 | Jehn ....................... 318/280 |
| 2003/0030396 A1 * | 2/2003 | Bastholm et al. .......... 318/434 |
| 2003/0173917 A1 * | 9/2003 | Haussecker et al. ....... 318/280 |
| 2005/0067987 A1 * | 3/2005 | Nakazawa et al. ......... 318/434 |
| 2005/0083003 A1 * | 4/2005 | Mochizuki et al. ........ 318/452 |
| 2005/0083004 A1 * | 4/2005 | Yamamoto et al. ........ 318/452 |
| 2005/0088130 A1 * | 4/2005 | Ohshima .................. 318/469 |
| 2005/0116672 A1 * | 6/2005 | Ohshima .................. 318/286 |

FOREIGN PATENT DOCUMENTS

| EP | 0 556 540 A3 | 1/1993 |
| EP | 0 556 540 B1 | 1/1993 |

* cited by examiner

Primary Examiner—Paul Ip
(74) Attorney, Agent, or Firm—Baker Botts L.L.P.

(57) ABSTRACT

Device for controling an electrical motor mounted on the crossarm of a bridge circuit whose motor current is controllable with semiconductor components formed in a first bridge branch by an electromagnetic switching device and in a second bridge branch by two serially switched, opposite-phase timed semiconductor switches. The opposite-phase timing of both semiconductor switches creates an active freewheeling branch, thereby making a freewheeling diode unnecessary.

20 Claims, 2 Drawing Sheets

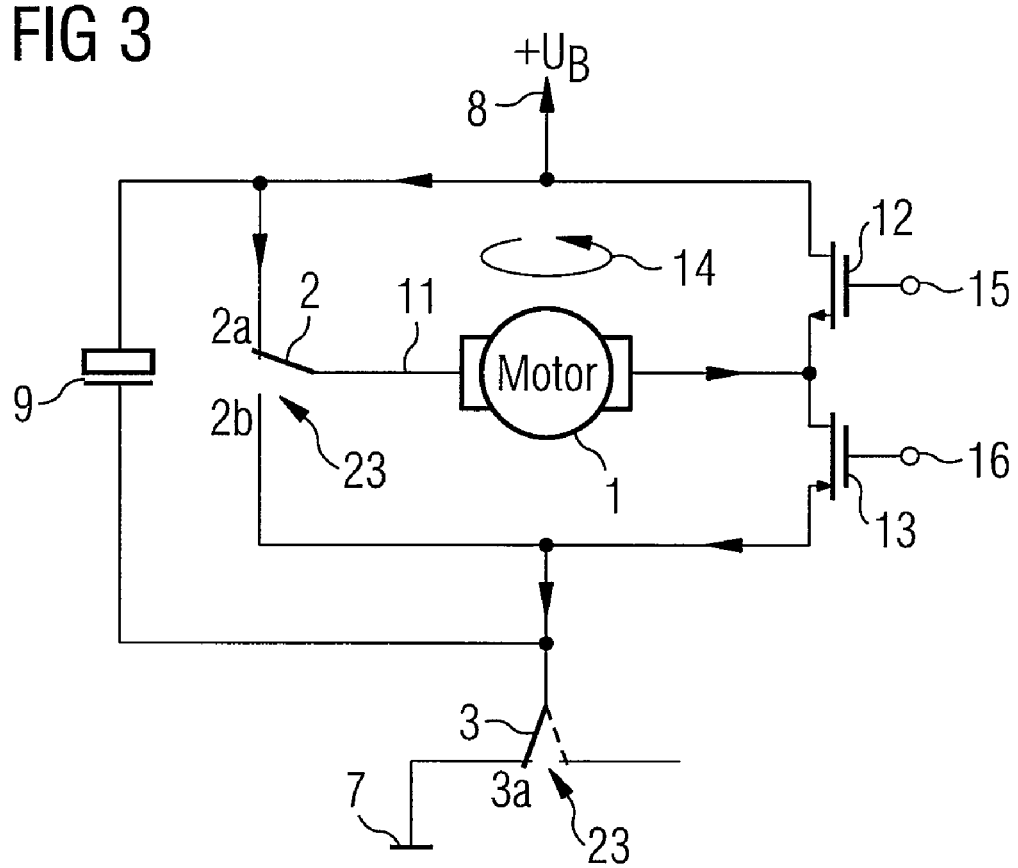

DEVICE AND METHOD FOR CONTROLLING AN ELECTRICAL MOTOR MOUNTED ON THE CROSSARM OF A BRIDGE CIRCUIT

PRIORITY

This application claims priority to German application number 10 2004 008 394.0 filed Feb. 20, 2004.

FIELD OF THE INVENTION

The invention concerns a device and method for controlling an electrical motor mounted on the crossarm of a bridge circuit whose motor current is controllable with semiconductor components.

BACKGROUND OF THE INVENTION

Bridge circuits with an electrical motor mounted in the crossarm are known from various power electronic circuits. A so-called full-bridge circuit normally consists of four electronic circuits in the bridge branches, of which two at a time are switched in a bridge branch between the supply voltage and the mass. These switches allow to control not only the direction of the motor current in the crossarm but also its magnitude, making it possible to operate the drive system in all four quadrants of the rotational speed-torque-family of curves.

In automobile technology such bridge circuits are used with comfort systems and serve for example as a drive system for separately controlled power windows, seat adjustors, sliding roofs or belt rollers. With an electrical power window it is necessary, for safety reasons and over a certain range of adjustment, to have an effective protection against being caught in it. The drive system is therefore designed in such a way that the sense of rotation of the motor is reversed as soon as a slowdown in rotation is detected. For a spring rate of 10 Newton per millimeter the squeezing force may not exceed 100 Newton. This function is ensured by an electronic control that monitors the engine revolutions during the adjustment. The control is often installed away from the center and integrated into the power window motor, minimizing thereby the need for wiring within the vehicle. The speed of the adjustment drive is regulated by a semiconductor device switched into the supply line to the battery, for example a timed power field effect transistor, also called chopper. So-called polarity-reversing relays are used to reverse the polarity of the motor. These are electromechanical polarity-reversing devices consisting of two electromagnetic systems, of which one operating contact each is connected to the crossarm of the bridge circuit and in which one inoperative contact each is switched into a bridge branch. One electromechanical polarity-reversing relay such as normally used for drive devices in motor vehicles, is described in EP 055 6 540 B 1.

When timing a direct-current motor mounted in the crossarm of a bridge circuit, so-called freewheeling diodes are necessary that take over the motor current during those switching phases during which the chopper severs the connection to the battery. These freewheeling diodes are connected in parallel to the bridge branches. A freewheeling diode is an additional component that causes additional costs and requires the corresponding mounting space on the controller. However, if the controller is integrated into the motor housing, the mounting space is very limited. Also, there is substantial cost pressure on all control electronics, as there is also on other components of the drive system. Efforts are always undertaken during the development phase to achieve the desired functionality with the lowest number of components and the least expensive components.

SUMMARY OF THE INVENTION

The purpose of the invention is to come up with a device and a method for controlling an electrical motor in such a way that no freewheeling diodes are necessary and that the controller can be manufactured at low cost.

The invention has the purpose of replacing the freewheeling circuit passively controlled by a freewheeling diode with an active freewheeling circuit. With this "mixed technology," the freewheeling diode can be dispensed with and the control can be implemented relatively inexpensively. What characterizes therefore the invention is that the bridge circuit is made in one bridge branch of an electromechanical circuit and in the other bridge branch of two serially switched semiconductor switches timed in opposite phases. With this opposite-phase control of the two semiconductor switches one of the two semiconductor switches carries the power flowing from the battery to the motor while the other switch carries off the flow of current maintained through the effect of the motor inductance.

The preferred embodiment is one in which the semiconductor switches are designed as field effect transistors.

When it comes to controlling the semiconductor switches it is useful for the field effect transistors to have different conductivity, i.e. the semiconductor switches switched serially in a bridge branch consist preferably of a P-canal power field effect transistor and an N-canal power field effect transistor.

Desirable from the circuit design viewpoint is an array in which the P-canal power field effect transistor is mounted in a section of the bridge branch lying between the positive pole of the supply voltage and a motor connection while the N-canal of the power field effect transistor is switched in a section of the bridge branch lying between the negative pole of the supply voltage and a motor connection.

In order to prevent components of the controller from being destroyed in case of an accidentally incorrectly poled connection of the battery terminals, it is useful to switch a second electromagnetic system in one of the two lines connecting the bridge circuit to the vehicle battery, providing thus a protection against wrong poling. A polarity-reversing relay featuring already two electromagnetic systems can be used to great advantage here, with the first electromagnetic system being used as switch relay in a bridge branch and the second electromagnetic system of the polarity-reversing relay forming the protection against incorrect poling.

BRIEF DESCRIPTION OF THE DRAWINGS

In what follows the invention is explained with the help of examples referring to the illustrations that are provided. These show:

FIG. 3 shows the circuit according to FIG. 2, whereby the direction of the current is turned around in the crossarm of the bridge circuit and the freewheeling current is conducted to the part of the bridge circuit shown as being above.

DETAILED DESCRIPTION OF EMBODIMENTS OF THE INVENTION

Figure 1:
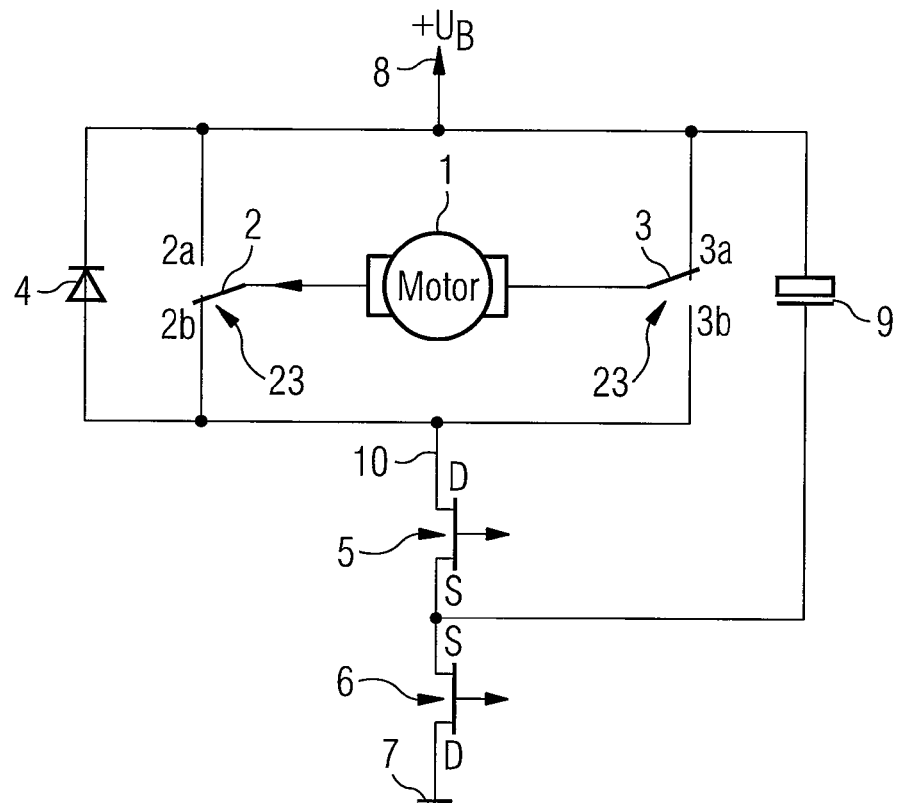
FIG. 1 shows a circuit according to the state of the art as used for an electrically activated power window in a motor vehicle.

FIG. 1 shows a circuit diagram for a drive device of a separately activated power window according to the state of the art. The circuit diagram shows a direct-current commutator-motor 1 mounted in the crossarm 11 of a bridge circuit. The sense of rotation of the motor 1 is reversible by way of a polarity-reversing relay 23. The polarity-reversing relay 23 consists of a first electromagnetic system by way of which an operating contact 2 is switchable between two opposite contacts 2a and 2b in the first bridge branch, and of a second electromagnetic system by way of which the operating contact 3 is switchable between two opposite contacts 3a and 3b in the second bridge branch. Depending on the switch position of the contacts of the polarity-reversing relay 23, the motor current flows in the shown crossarm 11 from left to right or—as shown in the circuit configuration of the polarity-reversing relay 23 in FIG. 1—from right to left. Two electronic switches 5 and 6 that are designed as power field effect transistors are switched in the line connecting the bridge circuit and the negative pole 7 of the motor vehicle battery. D and S respectively indicate Drain and Source of these two N-canal field effect transistors 5 and 6. The transistor 5 is timed. The transistor 6 serves as protection against incorrect poling, i.e. the switch 6 is normally shut down and is opened only in case of an incorrect poling of the operating voltage UB. An electrolytic capacitor 9 is switched between the positive pole 8 of the supply voltage UB and the line connecting the two switches 5 and 6. When the switch 5 is open, the motor current, which is also driven by the motor inductance, flows over a freewheeling diode 4 switched parallel to the two bridge branches.

Figure 2:
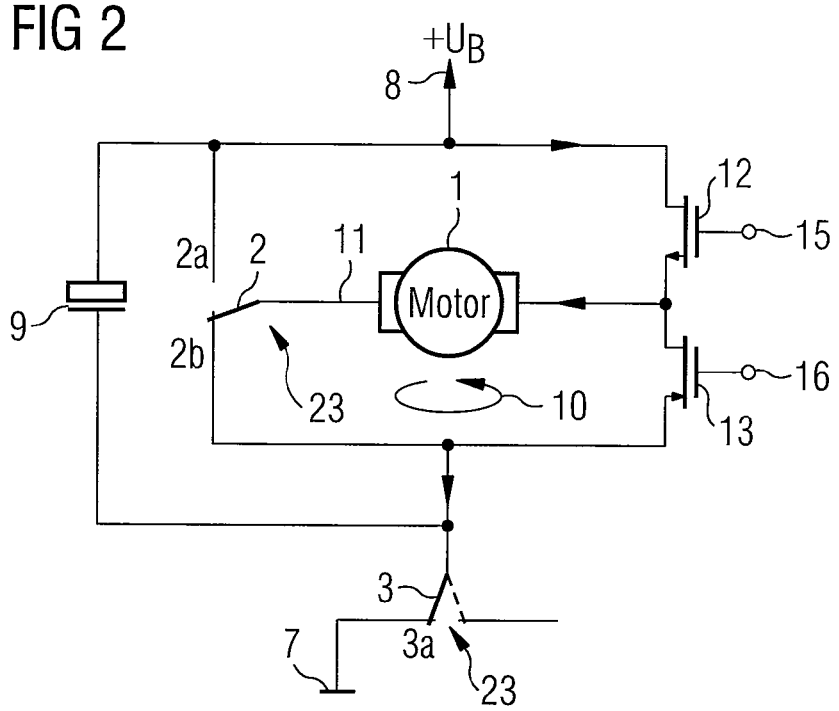
FIG. 2 shows a circuit according to the invention, whereby in deviation from FIG. 1 an electromagnetic switching device is mounted in one of the two bridge branches and the motor current is controlled by timing two semiconductor switches serially switched in the second bridge branch and timed in opposite phases, with the freewheeling current being actively conducted into a circuit arranged in the part of the bridge circuit shown as being below.

One example of embodiment of the drive control according to the invention is shown in FIG. 2 and FIG. 3. The two circuit diagrams show again a motor 1 in the crossarm 11 of a bridge circuit. The bridge circuit is connected via connection lines to the terminals 7, 8 of a voltage source UB. Similar to the circuit in FIG. 1, a protection against incorrect poling is switched in the connection line to the negative pole 7 of the battery, which in this case however consists of an electromechanical switch whose operating contact 3 is separated from the inoperative contact 3a when the two poles of the motor vehicle battery are by accident incorrectly connected. An electrolytic capacitor 9 is switched parallel to the bridge branches. An electromagnetic switching device 23 is mounted in the left bridge branch. The switching device 23 consists of an operating contact 2 that is switchable by an electromagnetic system between two inoperative contacts 2a and 2b. Contrary to FIG. 1 the switching device in the right bridge branch consists of two serially switched electronic circuits that are designed as power field effect transistors 12 and 13. Control signals are fed into the control connector 15 and 16 of the switches 12 and 13. These control signals are shifted in relation to each other in opposite phase rendering one of the two switches 12 or 13 at a time conductive while the other is blocking. As shown in more detail below, depending on the direction of the current in the crossarm 11, one of these two switches 12 or 13 takes on the role of a so-called chopper that times the current going from the battery to the motor while the other conducts the motor current actively in a so-called freewheeling circuit when the chopper is open.

The presentation in FIG. 2, in which the current in the middle branch 11 flows from right to left (indicated by an arrow) assumes, to start with, that the switch 12 is in a conductive state. The motor 1 takes up power from the battery. The direction of the current in the circuit diagram of FIG. 2 runs from the positive pole 8 of the supply voltage via the crossarm 11 and the operating contact 2 adjoining the inoperative contact 2b to the negative pole 7 of the battery. As soon as switch 12 opens, switch 13 becomes conductive by way of the opposite-phase control and conducts the current driven also by the motor inductance to the freewheeling circuit indicated in FIG. 2 with an arrow with reference 10.

In FIG. 3 the sense of rotation is reversed from what it is in FIG. 2, i.e. the current in the crossarm 11 of the bridge circuit now runs from left to right (indicated by arrows). The direction of the current runs via the operating contact 2 adjoining contact 2a to the diagonal branch 11 and from there via the switch 13 and the closed switch position of the protection against incorrect poling to the negative pole 7 of the motor vehicle battery. If one now assumes with this circuit configuration that the chopper, here the switch 13, interrupts the current, the switch 12 becomes conductive and takes over the current maintained by the motor inductance into the upper freewheeling circuit indicated in FIG. 3 with an arrow with reference 14.

The generation of the control signals fed into the control electrodes in 15 and 16 is achieved using well-known switching technology and is not shown in greater detail here. Of course, in doing so the case that both semiconductor switches are conductive at the same time must be prevented. This can be best assured by inserting periodically a safety interval in the switch phases in which both semiconductor switches are in a non-conductive state.

Of course, the invention is not limited to the application and switching technology explained above but can be applied also to other electronic switches such as for example insulated gate bipolar transistors, bipolar transistors and thyrsitors.

I claim:

1. A system for controlling the current of an electrical motor mounted on the crossarm of a bridge circuit, said system comprising:
    an electromagnetic switching device arranged in a first bridge branch to couple a first motor terminal either with a first or second terminal of a power source, and
    two serially switched, opposite-phase timed semiconductor switches arranged in a second bridge branch, wherein a first semiconductor switch is coupled between the first terminal of the power source and a second motor terminal and a second switch is coupled between the second motor terminal and the second terminal of the power source.

2. A system according to claim 1, wherein the opposite-phase timing occurs in such a way that during the switching phases in which one of the two semiconductor switches opens the other of the two semiconductor switches closes, thereby conducting the flow of current maintained through the effect of the motor inductance into a free-wheeling circuit.

3. A system according to claim 1, wherein the semiconductor switches are designed as field effect transistors.

4. A system according to claim 3, wherein the field effect transistors have different conductivity.

5. A system according to claim 4, wherein the first semiconductor switch is a P-canal power field effect transistor, and the second semiconductor switch is an N-canal power field effect transistor.

6. A system according to claim 1, wherein the electromagnetic switching device is formed by a change-over relay.

7. A system according to claim 6, wherein the change-over relay is formed by a first electromagnetic system of a polarity-reversing relay.

8. A system according to claim 7, wherein the contact device of a second electromagnetic system of the polarity-reversing relay is switched in one of the lines connecting the bridge circuit to an energy source, thereby forming a protection against incorrect poling.

9. A system according to claim 1, further comprising a mechanical switching device formed by two simple switching relays serially switched in the first bridge branch.

10. A system according to claim 1, wherein the motor is a driver of a separately activated power window of a motor vehicle.

11. A method for controlling a reversible electrical motor mounted in the crossarm of a bridge circuit, said method comprising:
   determining a rotation of the motor via an electromechanical switching device mounted in a first bridge branch, and
   controlling a motor current at a given sense of rotation via two opposite-phase timed semiconductor switches arranged in a second bridge branch, wherein a first semiconductor switch is controlled to close an energizing circuit and a second switch is controlled to close a free wheeling circuit.

12. A method according to claim 11, further comprising the activation of a relay occurs during switching phases, the opposite-phase control of the two semiconductor switches is interrupted, and both semiconductor switches are in a non-conductive state.

13. A system according to claim 1, further comprising a further electromagnetic switching device coupled in series between the bridge circuit and the second terminal of the power source.

14. A system for controlling a reversible electrical motor mounted in the crossarm of a bridge circuit, comprising:
   an electromechanical switching device arranged in a first bridge branch to determine a rotation of the motor, and
   two opposite-phase timed semiconductor switches arranged in a second bridge branch, wherein a first semiconductor switch is controlled to close an energizing circuit and a second switch is controlled to close a free wheeling circuit.

15. A system according to claim 14, wherein the opposite-phase timing occurs in such a way that during the switching phases in which one of the two semiconductor switches opens the other of the two semiconductor switches closes, thereby conducting the flow of current maintained through the effect of the motor inductance into a free-wheeling circuit.

16. A system according to claim 14, wherein the electromagnetic switching device is formed by a change-over relay.

17. A system according to claim 16, wherein the change-over relay is formed by a first electromagnetic system of a polarity-reversing relay.

18. A system according to claim 17, wherein the contact device of a second electromagnetic system of the polarity-reversing relay is switched in one of the lines connecting the bridge circuit to an energy source, thereby forming a protection against incorrect poling.

19. A system according to claim 14, further comprising a mechanical switching device formed by two switching relays serially switched in the first bridge branch.

20. A system according to claim 14, wherein the motor is a driver of a separately activated power window of a motor vehicle.

* * * * *